July 9, 1940.    J. N. VELOS    2,206,861
DOUGH PRESS
Filed Oct. 12, 1939
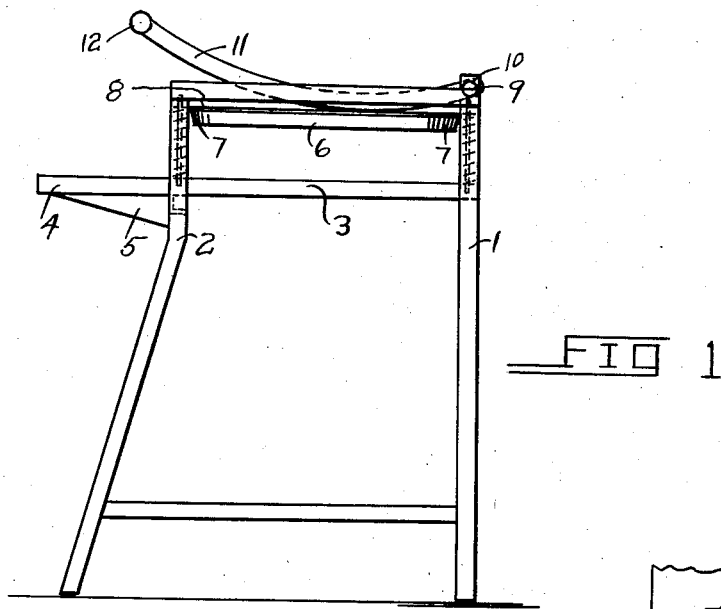
FIG 1
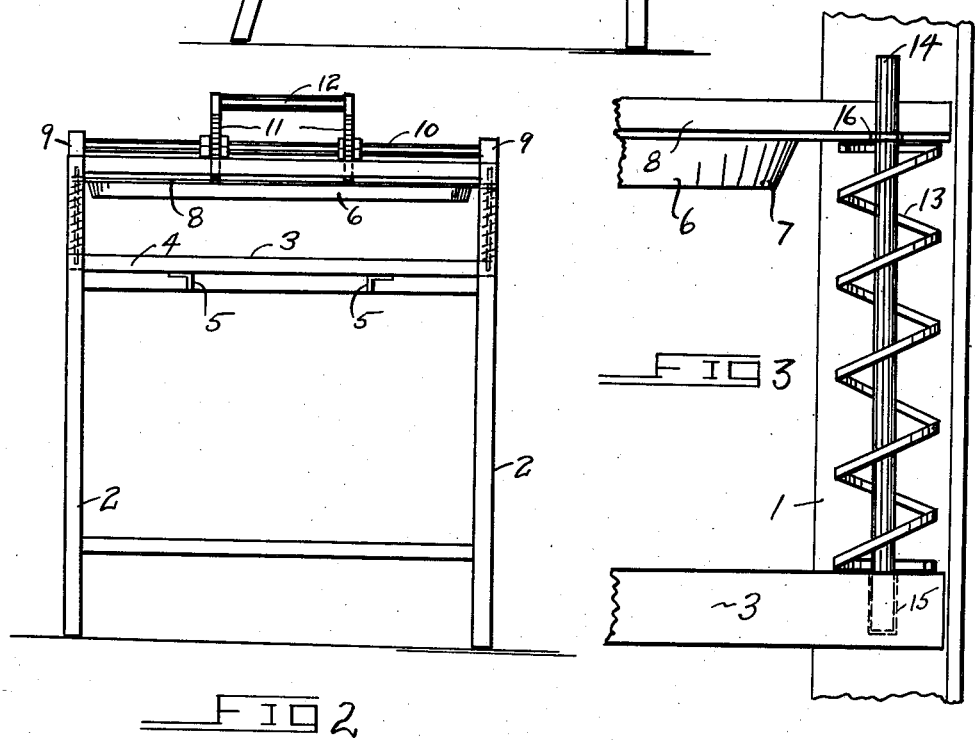
FIG 2
FIG 3
James N. Velos
INVENTOR
BY W. B. Harpman
ATTORNEY Patented July 9, 1940

2,206,861

UNITED STATES PATENT OFFICE 2,206,861

DOUGH PRESS

James N. Velos, Youngstown, Ohio

Application October 12, 1939, Serial No. 299,123

3 Claims. (Cl. 107—15)

The principal object of this invention is the provision of a baker's appliance suitable for pressing dough to be formed into buns and the like.

A further object of this invention is the provision of a simplified dough press wherein the various parts may be readily disassembled and assembled for cleaning or other purposes.

A further object of this invention is the provision of a dough press so formed that the dough receiving table is stationary and solid and the dough pressing plate is movable in relation thereto and adapted to be moved by hand operated means positioned thereabove.

A still further object of the invention is the provision of a dough press wherein the dough pressing plate is provided with means to return the same to non-pressing position automatically.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a side elevation of the dough press showing the device in position to receive a pan of dough for flattening.

Figure 2 is a front elevation of the dough press shown in Figure 1.

Figure 3 is a greatly enlarged detail view of one of the corner portions of the dough press shown in Figure 2.

By referring to the drawing in Figure 1 in particular, it will be seen that the dough press comprises a rectangular frame 1, the front legs 2 of which are bent outwardly so as to provide for the stability of the press at such times as the same is being used. Positioned near the top of this rectangular frame there is a dough receiving table 3 which, in turn, has positioned adjacent it and in front of it a shelf 4 which is in effect an extension of the table 3. This shelf 4 is supported by triangular shaped supporting brackets 5 which, in turn, are affixed to the front legs 2 of the device and to suitable cross braces positioned therebetween. At the top of this rectangular frame 1 there is slidably positioned therein a dough pressing plate 6. This dough pressing plate 6 comprises a section of suitable hard wood rounded at its corners 7 and provided with reinforcing structure of suitable angle iron 8 on the top thereof.

By referring to Figure 2 it will be seen that bearing blocks 9 have been positioned upon each of the rear legs of the rectangular frame and a shaft 10 positioned therethrough and therebetween. Centrally positioned on this shaft 10 there is positioned a pair of arms 11 which are curved in shape so as to provide a rocker leverage upon the pressing plate 6 when a handle 12 positioned between the outermost ends of the rocker arms is depressed manually. The rocker arms 11 are so formed that they bear against the center of the pressing plate 6 at such times as the pressing plate is flattening the dough thereunder.

In order that the pressure plate will return to its position near the upper ends of the rectangular frame there has been provided a plurality of coil springs 13 one being located adjacent each of the rounded corners of the pressing plate 7 between an extended portion of the angle irons 8 and the table 3 (see Figure 3). In order that the coil springs 13 will remain in proper position and so that the pressing plate 6 will be suitably guided in its vertical movements, a plurality of guide rods 14 are provided, one through each of the coil springs 13 and of a length sufficient to extend downwardly into openings 15 formed in the table 3 and extending upwardly through openings 16 formed in the angle irons 8.

It will thus be seen that the pressing plate 6 and the rocker arms 11 serving as the leverage applying means thereof float in effect upon the four coil springs 13 and, further, that the pressing plate 6 may be removed from the device at any time by simply lifting the same upwardly and outwardly of the frame.

It will thus be seen that a convenient, practical and extremely simple baker's appliance has been provided which will competently serve its purpose of flattening raised balls of dough into flattened bun shapes prior to their baking.

What I claim is:

1. A dough press comprising a rectangular frame, a table positioned near the top of the said frame, a pressing plate movably positioned above the table by means of a plurality of coil springs positioned over a plurality of rods, the said rods functioning in openings in the said pressing plate structure and in the said table structure, a pivot bar positioned on said frame, rocker arms having one of their ends pivoted to the said pivot bar, a handle positioned between the other ends of the rocker arms, the said rocker arms being positioned in relation to the said pressing plate so that downward movement of the said handle results in the downward movement of the said pressing plate through the rocker-like action of the said rocker arms.

2. A dough press comprising a rectangular frame, a table positioned near the top of the said frame, a pressing plate movably positioned above the table by means of a plurality of coil springs positioned over a plurality of rods, the said rods functioning in openings in the said pressing plate structure and in the said table structure, a pivot bar positioned on said frame, rocker arms having one of their ends pivoted to the said pivot bar, a handle positioned between the other ends of the rocker arms, the said rocker arms being positioned in relation to the said pressing plate so that downward movement of the said handle results in the downward movement of the said pressing plate through the rocker-like action of the said rocker arms, a shelf positioned on the front of the said frame adjacent the said table, front legs of the said rectangular frame being bent forwardly to insure stability of the said dough press.

3. A dough press comprising a frame adapted to be positioned on a table, a pan receiving table positioned in the said frame, a pressing plate movably positioned above the said pan receiving table by means of a plurality of coil springs positioned over a plurality of rods, the said rods functioning in openings in the said pressing plate structure and in the said table structure, a pair of rocker arms having one of their ends pivoted to the said frame, a handle positioned between the other ends of the said rocker arms, the said rocker arms being positioned in relation to the said pressing plate so that downward movement of the said handle results in the downward movement of the said pressing plate through the rocker-like action of the said rocker arms.

JAMES N. VELOS.